(12) United States Patent
Deiseroth et al.

(10) Patent No.: US 8,075,865 B2
(45) Date of Patent: Dec. 13, 2011

(54) LITHIUM ARGYRODITE

(75) Inventors: Hans-Jörg Deiseroth, Siegen (DE); Shiao-Tong Kong, Siegen (DE); Marc Schlosser, Siegen (DE); Christof Reiner, Siegen (DE)

(73) Assignee: Universitat Seigen, Siegen (DE)

( * ) Notice: Subject to any disclaimer, the term of this patent is extended or adjusted under 35 U.S.C. 154(b) by 0 days.

(21) Appl. No.: 12/682,214

(22) PCT Filed: Oct. 7, 2008

(86) PCT No.: PCT/EP2008/063412
§ 371 (c)(1),
(2), (4) Date: Jun. 28, 2010

(87) PCT Pub. No.: WO2009/047254
PCT Pub. Date: Apr. 16, 2009

(65) Prior Publication Data
US 2010/0290969 A1 Nov. 18, 2010

(30) Foreign Application Priority Data
Oct. 8, 2007 (DE) .......................... 10 2007 048 289

(51) Int. Cl.
*C01B 17/22* (2006.01)
*C01D 15/00* (2006.01)
*C01D 15/06* (2006.01)
*H01M 6/18* (2006.01)

(52) U.S. Cl. ..... 423/508; 423/511; 423/179; 423/179.5; 429/322; 429/323

(58) Field of Classification Search .................. 423/508, 423/511, 179, 179.5; 429/322, 323
See application file for complete search history.

(56) References Cited

U.S. PATENT DOCUMENTS
2011/0081580 A1* 4/2011 Stadler et al. ................ 429/319

OTHER PUBLICATIONS

"New lithium ion conducting glass-ceramics . . ." by M. Tatsumisago et al., Solid State Ionics, vols. 154-155 (2002), pp. 635-640.*
"Structural Transformation of Non-Oxide Chalcogenide Glasses . . ." by Eckert et al., Chemistry of Materials, vol. 2, No. 3 (1990), pp. 273-279.*
"Li6PS5X: A Class of Crystalline Li-Rich Solids With an Unuassually High Li+ Mobility" by Deiseroth et al., Angew. Chem. Int. Ed., vol. 47, (2008), pp. 755-758.*
The English abstract of "Crystalline Halide Substituted Li-Argyrodites as Solid Electrolytes for Lithium Secondary Batteries", ECS Transactions, vol. 25, Issue 36, Oct. 4-9, 2009, 216th ECS Meeting Vienna Austria, poster session.*
Tatsumisago, M., et al., "New Lithium Ion Conducting Glass-Ceramics Prepared from Mechanochemical L12S-P2S5 Glasses", Solid State Ionics, North Holland Pub. Company, Amsterdam, NL, BD. 154-155, Dec. 2, 2005.
Kong, S.T, et al., "Synthesis and Characterization of Lithium Argyrodite, L17PS6", Zeitschrift Fur Anorganische und Allgemeine Chemie, Bd, 632, Nr. 12-13, Aug. 23, 2006.
Eckert, H., et al., "Structural transformation of non-oxide chalcogenide glasses", Chemistry of Materials, Bd., 2, Nr. 3, May 1990, Seiten 273-279.
Francisco, R.H.P., et al., "A study of the System Li-P-Se", Journal of Solid State Chemistry, Bd. 107, Nr. 2, Dec. 1993, Seiten 452-459.
Deiseroth H-J, et al., "Li6PS5X: A Class of Crystalline Li-rich Solids with an Unusually High Li <+> Mobility", Bd. 47, Nr. 4, Jan. 11, 2008, Seiten 755-758.
Reiner, Christof, et al., "Quiaternary Lithium Sleno Halide Argyrodites", Zeitschrift Fur Anorganische Und Allgemeine Chemie, Bd. 634, Nr. 11, Aug. 28, 2008, Seite 2041.

* cited by examiner

*Primary Examiner* — Timothy Vanoy
(74) *Attorney, Agent, or Firm* — Occhiuti Rohlicek & Tsao LLP

(57) ABSTRACT

The invention relates to lithium argyrodite of the general formula (I): $Li^+_{(12-n-x)}B^{n+}X^{2-}_{6-x}Y^-_x$ (I), where $B^{n+}$ is selected from the group consisting of P, As, Ge, Ga, Sb, Si, Sn, Al, In, Ti, V, Nb, and Ta; $X^{2-}$ is selected from the group consisting of S, Se, and Te; $Y^-$ is selected from the group consisting of Cl, Br, I, F, CN, OCN, SCN, and $N_3$; $0 \leq x \leq 2$, and a method for the production thereof, and the use thereof as a lithium-ion electrolyte in primary and secondary electrochemical energy storage.

20 Claims, No Drawings

LITHIUM ARGYRODITE

CROSS-REFERENCE TO RELATED APPLICATIONS

This application is the National Stage of International Application No. PCT/EP2008/063412, filed on Oct. 7, 2008, which claims the benefit of German Application Serial No. 10 2007 048 289.4, filed on Oct. 8, 2007, the contents of both of the foregoing applications are hereby incorporated by reference in their entirety.

The present invention relates to a novel class of lithium-rich solid-state compounds, a process for their preparation and their use as solid electrolytes in primary and secondary electrochemical energy stores.

Argyrodites have long been known and are derived from argyrodite $Ag_8GeS_6$, which was described for the first time in 1886 by C. Winkler and the analysis of which led to the discovery of germanium. The argyrodite family consists of more than 100 crystalline solids and includes, for example, those solid-state compounds in which the silver is replaced by copper, the germanium by gallium or phosphorus and the sulfur by selenium. Thus, Nitsche, Kuhs, Krebs, Evain, Boucher, Pfitzner and Nilges describe, inter alia, compounds such as $Cu_9GaS_6$, $Ag_7PSe_6$ and $Cu_8GaS_5Cl$, the solid-state structures of which are derived from argyrodite.

Li argyrodites were unknown for a long time, with the exception of the insufficiently characterized compound $Li_7PS_6$ (J. F. Brice, C. R. Seances in Acad. Sci. 1976, C283, 581). Recent investigations, for example by Eckert, Zhang and Kennedy in Chem. of Mat. 1990, 2, 273-279, relate to thermomechanical optimization experiments for the $Li_2S$—$P_2S_5$ system and show as a whole samples which do not have a single phase. However, signs of high lithium mobility are found for this system in many samples.

More detailed investigations have, however, shown that the production of single-phase solids in the $Li_2S$—$P_2S_5$ system is difficult and is greatly dependent, inter alia, on the starting materials and crucible materials used during the preparation, so that different byproducts form depending on the material used.

It is therefore an object of the present invention to provide a novel class of lithium-rich solid-state compounds which permit single-phase preparation in addition to high lithium ion mobility.

This object is achieved, according to the invention, by lithium argyrodites of the general formula (I):

in which
$B^{n+}$ is selected from the group consisting of P, As, Ge, Ga, Sb, Si, Sn, Al, In, Ti, V, Nb and Ta,
$X^{2-}$ is selected from the group consisting of S, Se and Te,
$Y^-$ is selected from the group consisting of Cl, Br, I, F, CN, OCN, SCN, $N_3$, and in which $0 \leq x \leq 2$.

Advantageously, the inventive class of novel lithium-rich argyrodites permits preparation of single-phase solids. In addition, the inventive compounds of the novel class have high lithium ion mobility, which can preferably be employed in a use as solid electrolyte. In contrast to known lithium electrolytes, the lithium argyrodites according to the invention can be used in a wide temperature range from −150° C. to 600° C. Thus, the temperature sensitivity of electrochemical energy stores which has been observable to date can be reduced.

The component $B^{n+}$ can preferably be selected from the group consisting of P, As, Ge, Ga, Sb, Si, Sn, Al, In, Ti, V, Nb and Ta. P, As, Sb and Ga are particularly preferred, especially with regard to use as an electrolyte constituent of a lithium accumulator.

The component $X^{2-}$ can be selected from the group consisting of S, Se and Te. In particular, components $X^{2-}$ selected from the group consisting of S and Se are favored in a preferred configuration of the invention, owing to their easier preparation.

The component $Y^-$ can preferably be selected from the group consisting of Cl, Br, I, F, OCN, SCN, $N_3$, CN. Cl, Br and I are particularly preferred, especially with regard to use as an electrolyte constituent of a lithium accumulator.

The lithium argyrodites according to the invention can preferably be compounds of the general formula (II):

$$Li_6PS_5Z \quad\quad (II),$$

in which the constituent Z may be a monovalent anion selected from the group consisting of the halides and the pseudohalides.

In a further preferred embodiment of the present invention, the component Z can be selected from the group consisting of Cl, Br, I.

Particularly when Z=I, these compounds show a high specific $Li^+$ ion conductivity, in said case Z=I of about $7 \times 10^{-3}$ $Scm^{-1}$ at room temperature. NMR investigations on these compounds have also indicated a high specific $Li^+$ mobility.

The compounds of the formula (II) where Z=Cl, Br or I can advantageously be prepared in a solid-state synthesis, for example according to the following reactions:

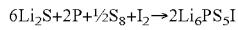

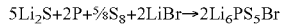

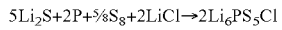

In a further preferred embodiment of the invention, the lithium argyrodites can be compounds of the general formula (III):

in which
$B^{5+}$ is selected from the group consisting of P, As and Sb,
$X^{2-}$ is selected from the group consisting of Se and Te,
$Y^-$ is selected from the group consisting of Cl, Br, I, F, CN, OCN, SCN, $N_3$, and in which $0 \leq a \leq 2$.

Furthermore preferred are inventive lithium argyrodites of the general formula (IV):

in which
$B^{5+}$ is selected from the group consisting of P, As, and Sb,
$X^{2-}$ is selected from the group consisting of Se and Te, and in which $0 \leq a \leq 2$.

The invention moreover relates to a process for the preparation of lithium argyrodites of the general formula (I), characterized by the steps:
  mixing of the stoichiometric amounts of the starting substances under an inert gas atmosphere,
  pressing of the resulting powder mixture to give pellets, and
  heating of the pellets to temperatures from 400° C. to 700° C. for a duration of from 3 days to 10 days.

According to the invention, a process which permits a simple procedure in addition to a good single-phase character of the crystalline compounds can advantageously be provided.

The process according to the invention can be carried out in particular at a temperature of from 500° C. to 600° C., preferably at 550° C.

In a further advantageous embodiment of the process, a duration of from 4 days to 8 days, preferably a duration of 7 days, can be provided.

An inventive lithium argyrodite of the general formula (I) can preferably be used as a lithium ion electrolyte for primary and secondary electrochemical energy stores.

The invention is described further by the following examples without being limited thereto.

EXAMPLES

1. Preparation of the Compound $Li_6PS_5I$ According to the Invention

For the preparation of the compound $Li_6PS_5I$, the starting materials $I_2$, $S_8$, $Li_2S$ and $P_2S_5$ were weighed out in the stoichiometric ratio under an argon inert gas atmosphere, transferred to a graphitized quartz ampoule and melted in vacuo. The sample was heated in a tubular furnace at a temperature of 550° C. for 6 days and then slowly cooled. Single-phase crystals of the compound $Li_6PS_5I$ were obtained as a white solid.

2. Preparation of the Compound $Li_6PS_5Br$ According to the Invention

For the preparation of the compound $Li_6PS_5Br$, the starting materials LiBr, $Li_2S$ and $P_2S_5$ were weighed out in the stoichiometric ratio under an argon inert gas atmosphere, transferred to a graphitized quartz ampoule and melted in vacuo. The sample was heated in a tubular furnace at a temperature of 550° C. for 6 days and then slowly cooled. Single-phase crystals of the compound $Li_6PS_5Br$ were obtained as a white solid.

3. Preparation of the Compound $Li_6PS_5Cl$ According to the Invention

For the preparation of the compound $Li_6PS_5Cl$, the starting materials LiCl, $Li_2S$ and $P_2S_5$ were weighed out in the stoichiometric ratio under an argon inert gas atmosphere, transferred to a graphitized quartz ampoule and melted in vacuo. The sample was heated in a tubular furnace at a temperature of 550° C. for 6 days and then slowly cooled. Single-phase crystals of the compound $Li_6PS_5Cl$ were obtained as a white solid.

4. Preparation of the Compound $Li_7PS_5Se$ According to the Invention

For the preparation of the compound $Li_7PS_5Se$, the starting materials $S_8$, $Li_2S$ and $P_2Se_5$ were weighed out in the stoichiometric ratio under an argon inert gas atmosphere, transferred to a graphitized quartz ampoule and melted in vacuo. The sample was heated in a tubular furnace at a temperature of 500° C.-550° C. for 6 days and then slowly cooled. Single-phase crystals of the compound $Li_7PS_5Se$ were obtained as a white solid.

The invention claimed is:
1. A lithium argyrodite of the general formula (I):

$$Li^+{}_{(12-n-x)}B^{n+}X^{2-}{}_{6-x}Y^-{}_x \quad (I)$$

in which $B^{n+}$ is selected from the group consisting of P, As, Ge, Ga, Sb, Si, Sn, Al, In, Ti, V, Nb, and Ta,
$X^{2-}$ is selected from the group consisting of S, Se, and Te,
$Y^-$ is selected from the group consisting of Cl, Br, I, F, CN, OCN, SCN, and $N_3$, and in which $0 \leq x \leq 2$.

2. The lithium argyrodite as claimed in claim 1, characterized in that the component $B^{n+}$ is selected from the group consisting of P, As, and Ga.

3. The lithium argyrodite as claimed in claim 1, characterized in that the component $X^{2-}$ is selected from the group consisting of S and Se.

4. The lithium argyrodite as claimed in claim 1, characterized in that the component $Y^-$ is selected from the group consisting of Cl, Br, and I.

5. The lithium argyrodite as claimed in claim 1, characterized in that it is a compound of the general formula (II):

$$Li_6PS_5Z \quad (II)$$

in which the constituent Z is a monovalent anion selected from the group consisting of the halides and pseudohalides.

6. The lithium argyrodite as claimed in claim 5, characterized in that the component Z is selected from the group consisting of Cl, Br, and I.

7. The lithium argyrodite as claimed in claim 1, characterized in that it is a compound of the general formula (III):

$$Li_6B^{5+}S_{5-a}X^{2-}{}_aY^- \quad (III)$$

in which
$B^{5+}$ is selected from the group consisting of P, As, and Sb,
$X^{2-}$ is selected from the group consisting of Se and Te,
$Y^-$ is selected from the group consisting of Cl, Br, I, F, CN, OCN, SCN, $N_3$, and in which $0 \leq a \leq 2$.

8. The lithium argyrodite as claimed in claim 1, characterized in that it is a compound of the general formula (IV):

$$Li_7B^{5+}S_{6-a}X^{2-}{}_a \quad (IV)$$

in which
$B^{5+}$ is selected from the group consisting of P, As, and Sb,
$X^{2-}$ is selected from the group consisting of Se and Te, and in which $0 \leq a \leq 2$.

9. A process for the preparation of a lithium argyrodite of the general formula (I), characterized by the steps:
mixing of the stoichiometric amounts of the starting substances under an inert gas atmosphere,
pressing of the resulting powder mixture to give pellets, and
heating of the pellets to temperatures from 400° C. to 700° C. for a duration of from 3 days to 10 days.

10. The process for the preparation of a lithium argyrodite as claimed in claim 9, characterized in that temperatures of from 500° C. to 600° C. are established.

11. The process for the preparation of a lithium argyrodite as claimed in claim 9, characterized in that the heating is carried out for a duration of from 4 days to 8 days.

12. Primary and secondary electrochemical energy stores comprising a lithium ion electrolyte, wherein the lithium ion electrolyte is the lithium argyrodite as claimed in claim 1.

13. The lithium argyrodite as claimed in claim 2, characterized in that the component $X^{2-}$ is selected from the group consisting of S and Se.

14. The lithium argyrodite as claimed in claim 2, characterized in that the component $Y^-$ is selected from the group consisting of Cl, Br, and I.

15. The lithium argyrodite as claimed in claim 3, characterized in that the component $Y^-$ is selected from the group consisting of Cl, Br, and I.

16. The lithium argyrodite as claimed in claim 13, characterized in that the component $Y^-$ is selected from the group consisting of Cl, Br, and I.

17. The lithium argyrodite as claimed in claim 2, characterized in that it is a compound of the general formula (II):

$$Li_6PS_5Z \qquad (II)$$

in which the constituent Z is a monovalent anion selected from the group consisting of the halides and pseudohalides.

18. The lithium argyrodite as claimed in claim 3, characterized in that it is a compound of the general formula (II):

$$Li_6PS_5Z \qquad (II)$$

in which the constituent Z is a monovalent anion selected from the group consisting of the halides and pseudohalides.

19. The lithium argyrodite as claimed in claim 4, characterized in that it is a compound of the general formula (II):

$$Li_6PS_5Z \qquad (II)$$

in which the constituent Z is a monovalent anion selected from the group consisting of the halides and pseudohalides.

20. The lithium argyrodite as claimed in claim 14, characterized in that it is a compound of the general formula (II):

$$Li_6PS_5Z \qquad (II)$$

in which the constituent Z is a monovalent anion selected from the group consisting of the halides and pseudohalides.

* * * * *